US006748733B2

(12) United States Patent
Tamaro (10) Patent No.: US 6,748,733 B2
(45) Date of Patent: Jun. 15, 2004

(54) SYSTEM FOR WASTE HEAT AUGMENTATION IN COMBINED CYCLE PLANT THROUGH COMBUSTOR GAS DIVERSION

(76) Inventor: Robert F. Tamaro, 128 Danefield Pl., Moraga, CA (US) 94556

( * ) Notice: Subject to any disclaimer, the term of this patent is extended or adjusted under 35 U.S.C. 154(b) by 46 days.

(21) Appl. No.: 09/863,031

(22) Filed: May 21, 2001

(65) Prior Publication Data

US 2002/0029558 A1 Mar. 14, 2002

Related U.S. Application Data

(63) Continuation-in-part of application No. 09/395,482, filed on Sep. 14, 1999, now abandoned.
(60) Provisional application No. 60/100,373, filed on Sep. 15, 1998.

(51) Int. Cl.$^7$ .................................................. F02C 6/18
(52) U.S. Cl. .................................................. 60/39.182
(58) Field of Search ........................ 60/39.182, 39.183, 60/39.54, 39.58; 415/114

(56) References Cited

U.S. PATENT DOCUMENTS 4,660,375 A * 4/1987 Hyde et al. ............... 60/39.183

* cited by examiner

Primary Examiner—Louis J. Casaregola
(74) Attorney, Agent, or Firm—Steven H. Arterberry (57) ABSTRACT

The present invention relates to steam generating systems in a combined cycle plant that is comprised of a gas turbine section that is operatively coupled to a steam cycle section to produce mechanical energy for electrical power generation, or for other purposes. In one embodiment, a gas diversion valve between the gas turbine section and the steam cycle section diverts at least a portion of the hot combustion gases generated by the gas turbine section to the steam cycle section, thereby augmenting the heat available to the steam cycle section. In another embodiment, steam produced within the steam cycle section is communicated to at least one of the turbines in the gas turbine section to augment the power output of the plant. In yet another embodiment, the steam cycle section may be selectively altered to allow the plant to accommodate the various tasks associated with sugar cane processing.

7 Claims, 6 Drawing Sheets

SYSTEM FOR WASTE HEAT AUGMENTATION IN COMBINED CYCLE PLANT THROUGH COMBUSTOR GAS DIVERSION

CROSS-REFERENCE TO RELATED APPLICATIONS

This application is a continuation-in-part application of U.S. patent application Ser. No. 09/395,482, filed Sep. 14, 1999 (abandoned), which claims priority from U.S. Provisional Patent Application No. 60/100,373, filed Sep. 15, 1998.

TECHNICAL FIELD

This invention relates generally to an apparatus and method for utilizing waste heat in a combined cycle power plant. More particularly, hot combustion gases are selectively combined with the waste exhaust gases through a diverter system to permit the temperature, pressure and quality of the steam generated in the combined cycle plant to be selectively controlled.

BACKGROUND OF THE INVENTION

The simplicity and flexibility of gas turbine power plants have made them increasingly attractive to electrical utilities as a means for generating electrical power. The low capital cost, ease of operation and variety of fuels that can be accommodated in gas turbine plants are viewed as significant advantages generally not available in conventional boiler-fired power plants. In particular, the brief start up period associated with gas turbine power plants have made them particularly attractive as a supplemental electrical generating means during short periods of peak electrical loading.

When a gas turbine power plant is used on a sustained basis for the generation of electricity, however, differences inherent in the thermodynamic processes governing a steam power cycle and a gas turbine power cycle generally favor the use of a steam power cycle for sustained operation. For example, although the pressure of the exhaust gas leaving a gas turbine plant is approximately atmospheric, the temperature of the exhaust gases is still relatively high. Since no further expansion of the exhaust gas is possible, the heat in the exhaust gas is generally wasted, resulting in relatively low energy conversion efficiencies for the gas turbine plant. In contrast, a conventional steam power plant, when operated with a condenser, permits heat to be rejected at a temperature much closer to the surrounding environmental temperature, which results in a greater energy conversion efficiency.

The elevated exhaust gas temperatures generally associated with gas turbine power plants suggests that a gas turbine power plant may be combined with the advantageous features of a conventional steam power plant to achieve cogeneration in a combined cycle power plant, where the source of thermal energy for the steam cycle is provided at least in part by the hot exhaust gases from the gas turbine plant. As a result, considerable effort has been expended in developing methods to recover the available energy in the gas turbine exhaust flows through the use of combined cycle power plants, particularly where the gas turbine power plant operates on a sustained basis.

Figure 1:
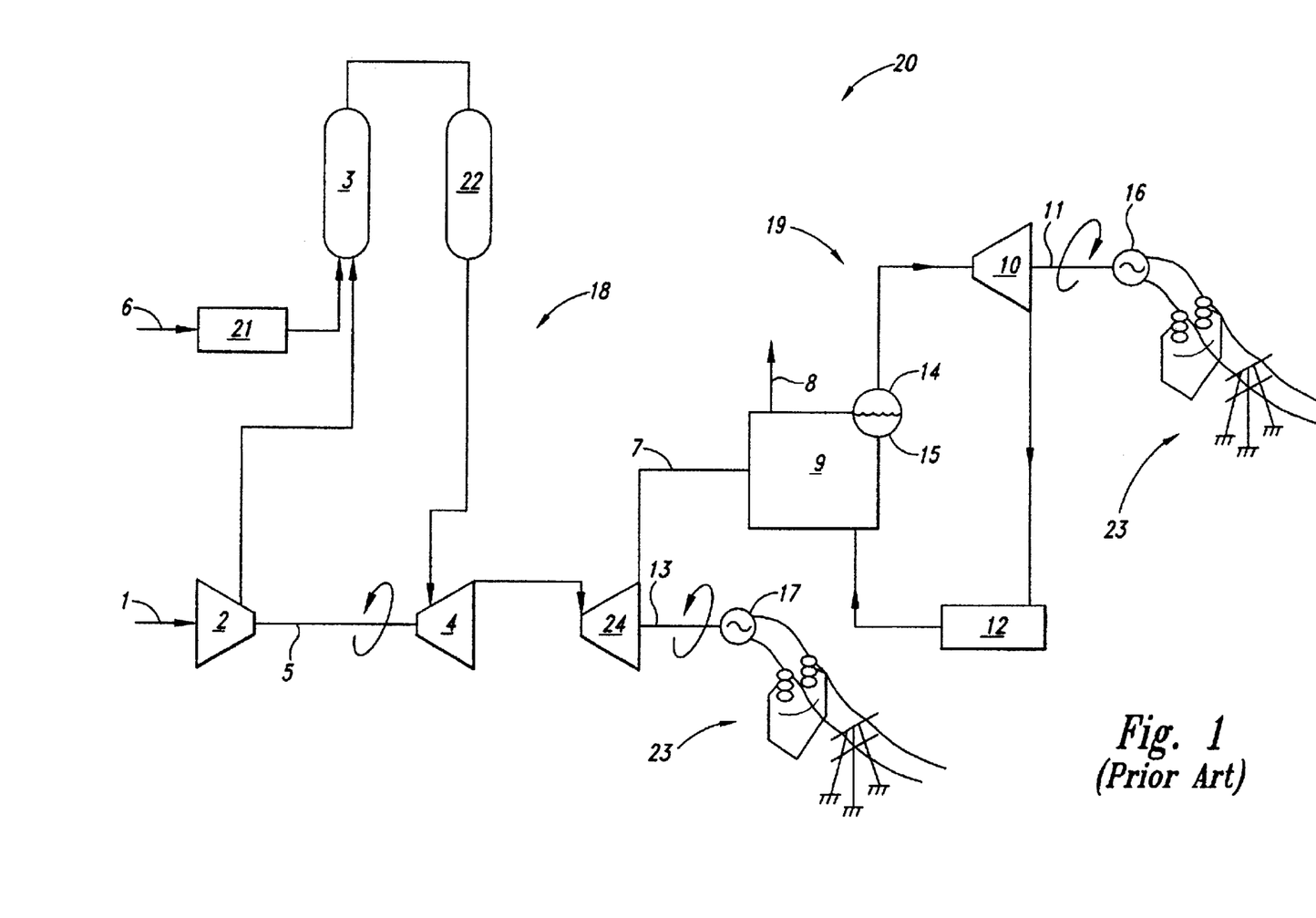
FIG. 1 is a schematic view of a combined cycle power plant according to the prior art.

Referring now to FIG. 1, a combined cycle power plant 20 according to the prior art is shown. The combined cycle power plant 20 generally consists of a gas turbine section 18 that is coupled to a steam cycle section 19. The power plant 20 as shown in FIG. 1 is structured to utilize solid fuels, as will be discussed in further detail below. The gas turbine section 18 generally includes a compressor 2 that receives and compresses atmospheric air 1 and delivers the compressed air to a combustion chamber 3. The combustion chamber 3 also receives pulverized fuel material from a fuel pulverizer and conveyor 21 that, in turn, receives material from a fuel source 6. The pulverized fuel is directed to the combustion chamber 3 where it is mixed with the compressed air and burned with the pulverized fuel. The hot gases resulting from the combustion are routed to a cyclone separator 22 to separate fly ash from the combustion gases. The combustion gases are routed to a turbine 4, where they are partially expanded to recover sufficient mechanical energy to drive the compressor 2 through a power transmission shaft 5. The combustion gases are further expanded through a power turbine 24 that is coupled to an electrical generator 17 through a power transmission shaft 13. Electrical energy produced by the generator 17 may be supplied to an external electrical supply grid 23. Subsequent to the expansion of the exhaust gas in the power turbine 24, the gases 7 are routed from the turbine 24 to the steam cycle section 19, which generally includes a heat recovery steam generator (HRSG) 9 that receives the exhaust gas 7. Steam 14 is generated in the HRSG 9 when the latent heat of evaporation is transferred from the exhaust gas 7 to the feed water 15 within the HRSG 9. The exhaust gas 7 is then released to the atmosphere through a stack 8. The steam 14 thus generated is routed to a steam turbine 10 and expanded to recover mechanical energy. The steam turbine 10 is coupled to an electrical generator 16 by a transmission shaft 11. Electrical energy produced by the generator 16 may also be supplied to the grid 23. The steam 14 exhausted from the turbine 10 is routed to a condenser 12, and then returned to the HRSG 9 for reheating.

Still referring to FIG. 1, the steam 14 generated in the HRSG 9 preferably attains sufficient pressure and temperature to obtain acceptable efficiencies from the steam cycle section 19, and to minimize the moisture content in the steam 14. However, a particular shortcoming associated with the foregoing combined cycle plant 20 is that the temperature of the exhaust gas 7 frequently limits the temperature of the steam generated in the HRSG 9. Moreover, the exhaust gas temperature similarly limits the maximum pressure of the steam since the saturation temperature of the steam increases with its pressure and only the portion of the heat in the exhaust gas 7, which is above the saturation temperature of the feed water 15 in the HRSG 9, is available for the generation of steam. Unless the temperature of the exhaust gas 7 entering the HRSG 9 can be augmented, a lower thermal efficiency from the steam power section 19 is often encountered.

Reduced exhaust gas temperatures are particularly problematic in combined cycle plants 20 that employ biomass fuels, since the heating values of these fuels is significantly lower than heating values associated with hydrocarbon gases, coal or petroleum distillate fuels. Biomass fuels are defined as a solid fuel material of plant origin, consisting, for example, of wood chips or scrap residues, tree barks, or bagasse from sugar cane processing. As a result, the low temperature of the exhaust gas 7 prevents biomass combustion plants from using the exhaust gas energy for cogeneration. For example, U.S. Pat. No. 5,720,165 to Rizzie, et al., discloses a biomass combustion system that generates steam for injection into the power turbine of the gas turbine plant. The Rizzie patent does not disclose a system may be used in a combined cycle plant, as described above.

Other prior art systems have addressed the problem of insufficient exhaust gas temperatures in combined cycle plants by relying on sophisticated feed water management systems, and therefore do not propose augmenting the energy in the exhaust gases exhausted from the gas turbine plant. For example, U.S. Pat. No. 5,799,481 to Fetescu discloses that the performance of the steam power cycle portion of a combined cycle plant may be enhanced through a sophisticated feed water control system that uses an HRSG of complicated design. Similarly, U.S. Pat. No. 4,976,100 to Lee discloses that the exhaust gas energy of the gas turbine portion of the combined cycle plant may be more effectively recovered by allowing the exhaust gases, rather than steam exhausted from the steam turbine, to heat the feed water prior to entry into an HRSG. Accordingly, the prior art systems as disclosed in the Fetescu and Lee references are directed only towards more careful management of feed water heating, and cannot overcome the basic limitation of insufficient exhaust gas temperature inherent in combined cycle plants.

Thus, those concerned with the design and operation of combined cycle plants are highly aware of the need for a system that will permit the augmentation of the energy available in the gas turbine exhaust in a simple and convenient manner, thereby permitting the generation of steam of desired pressure, temperature and quality for various external steam consumers.

SUMMARY OF THE INVENTION

The present invention relates generally to steam generating systems in a combined cycle plant that is comprised of a gas turbine section that is operatively coupled to a steam cycle section to produce mechanical energy for electrical power generation, or for other purposes. In one aspect of the invention, a gas diversion valve is positioned between the gas turbine section and the steam cycle section of the combined plant to divert at least a portion of the hot combustion gases generated by the gas turbine section to the steam cycle section of the plant, thereby augmenting the heat available to the steam cycle section. In another aspect of the invention, steam produced within the steam cycle section of the combined plant is communicated to at least one of the turbines in the gas turbine section of the plant in order to augment the power output of the combined plant. In yet another aspect of the invention, the steam cycle section of the combined cycle plant may be selectively altered to allow the combined plant to accommodate the various tasks associated with sugar cane processing.

DETAILED DESCRIPTION OF THE INVENTION

The present invention relates generally to combined cycle plants consisting of a gas turbine power plant coupled to a steam power plant. Many of the specific details of certain embodiments of the invention are set forth in the following description and in FIGS. 2 through 7 to provide a thorough understanding of such embodiments. One skilled in the art will understand, however, that the present invention may have additional embodiments, or that the present invention may be practiced without several of the details described in the following description.

Figure 2:
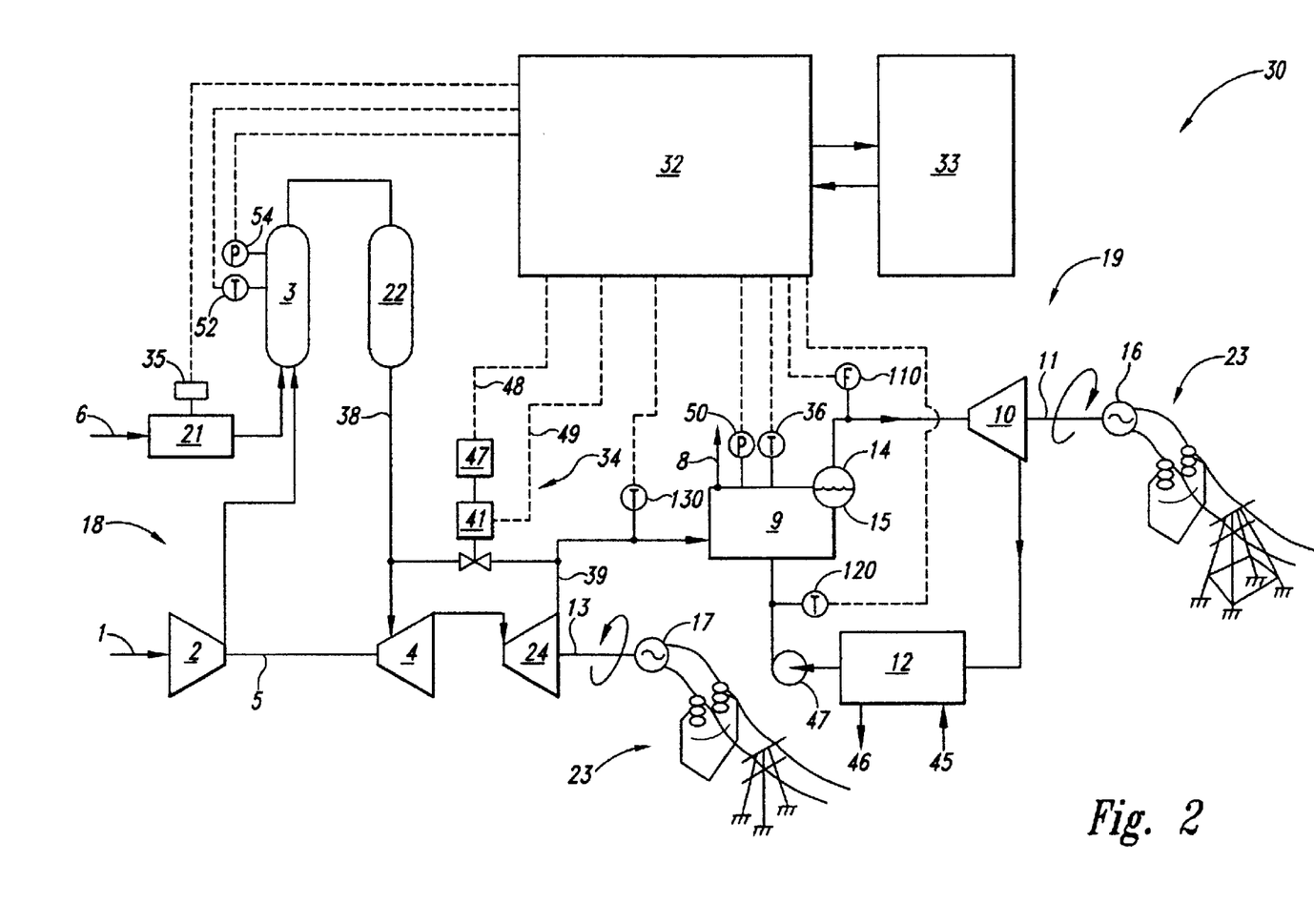
FIG. 2 is a schematic view of a combined cycle power plant according to an embodiment of the invention.

FIG. 2 is a schematic view of a combined cycle power plant 30 in accordance with an embodiment of the invention. The plant 30 is comprised of a gas turbine section 18 that is coupled to a steam cycle section 19. The gas turbine section 18 is further comprised of a compressor 2 that receives and compresses atmospheric air 1 and delivers the compressed air to a combustion chamber 3. Although a single compressor 2 is shown in the gas turbine section 18, it is understood that more than one compressor is within the scope of the invention. The combustion chamber 3 also receives pulverized fuel material from a fuel pulverizer and conveyor 21 that pulverizes a solid fuel material received from a fuel source 6. The pulverized fuel transported to the chamber 3 is mixed with the compressed air introduced into the chamber 3 and burned. The hot gases resulting from the combustion are transported to a cyclone separator 22 to separate fly ash, or other solid residues from the combustion gases. The hot combustion gases are then transported to a turbine 4 through a line 38, where they are partially expanded to recover mechanical energy to drive the compressor 2 through a power transmission shaft 5. The combustion gases are then transported to a power turbine 24, and are expanded further. The turbine 24 is mechanically coupled to an electrical generator 17 through a power transmission shaft 13 to transmit the rotational torque generated by the turbine 24 to the generator 17. Electrical energy produced by the generator 17 may be supplied to an external electrical supply grid 23. The electrical supply grid 23 may consist of a local grid that supplies electrical energy to a limited area, or alternatively, the grid 23 may be an electrical utility grid that services a wide service area. The gases exhausted from the power turbine 24 are then transported to the steam cycle section 19 for the generation of steam through a line 39. Still referring to FIG. 2, the steam cycle portion is comprised of a heat recovery steam generator (HRSG) 9 that receives the exhaust gas leaving the power turbine 24 through the line 39. The HRSG 9 is generally a device that has internal arrays of convection surfaces that permit heat to be transferred from the exhaust gas to the feed water 15 contained within the HRSG 9. Steam 14 is generated in the HRSG 9 when the latent heat of evaporation is transferred from the exhaust gas to the feed water 15 within the HRSG 9. Following the transfer of heat from the exhaust gases to the feed water 15, the exhaust gases are released to the atmosphere through a stack 8. The steam 14 thus generated may then be routed to a steam turbine 10 and expanded to recover mechanical energy. The steam turbine 10 may be coupled to an electrical generator 16 by a transmission shaft 11, to impart a rotational torque to the generator 16. The electrical energy thus generated may then be supplied to the grid 23. The steam 14 exhausted from the turbine 10 is then transported to a condenser 12 that receives cooling water from a cooling water source 45, and releases the cooling water to a thermal dump 46. The condensed steam leaving the condenser 12 is then returned to the HRSG 9 by a feed water pump 47 for subsequent reheating. Although a single steam turbine 10 is shown, it is understood that more than one steam turbine may be used. For example, the steam 14 may be partially expanded in a high-pressure turbine, and then returned to the HRSG 9 for reheating. The reheated steam may then be further expanded in a low-pressure turbine. Moreover, other types of prime movers may be used. For example, a reciprocating steam engine that utilizes one or more stages of steam expansion may also be used. Further, the water-cooled condenser 12 may be replaced with an air-cooled condenser. Still further, a cooling tower may be used in order to minimize the amount of waste heat released to the thermal dump 46.

Figure 3:
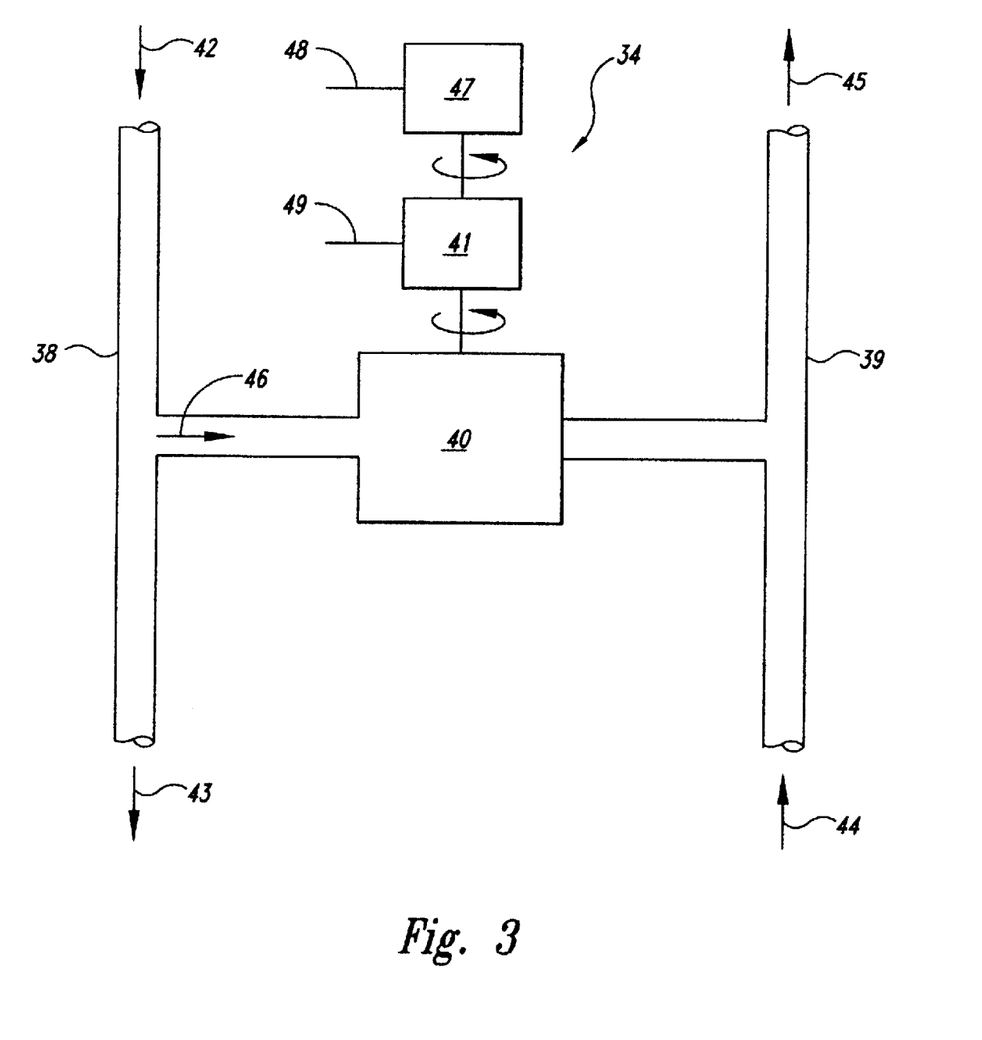
FIG. 3 is a schematic view of a bypass system according to an embodiment of the invention.

With reference now to FIGS. 2 and 3, a gas diversion valve 34 is fluidly coupled to line 38 and line 39 to controllably divert at least a portion of the hot combustion gas 42 (as shown in FIG. 3) from line 38 to the line 39 so that the diverted portion 46 of the hot gas 42 may be combined with the relatively cooler exhaust gas 44 that is exhausted from the power turbine 24. The resulting mixed gas 45 accordingly has a higher enthalpy that the exhaust gas 44. The non-diverted combustion gas 43 proceeds to the turbine 4 for expansion. The gas diversion valve 34 is further comprised of a valve body 40 that provides a continuously variable flow area to controllably vary the mass flow of the diverted portion 46 entering the line 39. An example of a suitable valve body 40 is the Type 8532 Flow Control Val e manufactured by Fisher Controls, Inc. of Marshalltown Iowa, although other suitable alternatives exist. A valve actuator 41 is positioned on the valve body 40 and is mechanically couple to the body 40 to position the valve body 40 to achieve a predetermined flow area. The actuator 41 may be a pneumatic actuator that relies on compressed air to position valve body 40, or he actuator 41 may be an electrical actuator. The actuator 41 is capable of receiving positional commands from a control system 32 (as shown in FIG. 2) through a command line 49. The control system 32 will be discussed in greater detail below. An example of a suitable pneumatic valve actuator is the Series 1051 Pneumatic Actuator manufactured by Fisher Controls, Inc., of Marshalltown, Iowa, although other suitable alternatives exist. The actuator 41 is mechanically coupled to an encoder 470 that provides positional information to the control system 32 regarding the position of the valve body 40. The encoder 470 is capable of transmitting positional signals to the control system 32 through a transmit line 48 An example of a suitable encoder 470 is the Series 3610J Valve Positioner, manufactured by Fisher Controls, Inc., of Marshalltown, Iowa, although other suitable alternatives exist.

Still referring to FIG. 3, the valve body 40 may be a three-way valve that is positioned in 38 and coupled to line 46 to divert at least a portion of the hot combustion gas 42 from line 38 to the line 39 so that the diverted portion 46 of the hot gas 42 may be combined with the relatively cooler exhaust gas 44, in the same manner as described above. The non-diverted combustion gas 43 may similarly proceed to the turbine 4 for expansion. A three-way valve as described would permit the flow of the non-diverted combustion gas 43 to be completely interrupted, and bypass all of the hot combustion gas 42 to line 39. This arrangement would advantageously provide a protective safeguard to prevent the gas turbine section 18 from abruptly over-speeding in cases where the electrical load (at generators 16 and/or 17 as shown in FIG. 2) is suddenly removed. Although all of the hot combustion gas 42 is diverted to the steam cycle section 19, those skilled in the art of steam power design will recognize that protective devices that vent excess steam pressure are routinely incorporated in steam cycle plants.

Referring again to FIG. 2, the control system 32 will now be described in greater detail. The control system 32 is coupled to a temperature sensor 36 located at the HRSG 9 to sense the steam temperature developed by the HRSG 9. The temperature sensor 36 is generally comprised of a sensor that provides a continuous indication of temperature, such as a thermocouple or thermopile, although other temperature sensing devices well known to those skilled in the art may also be used. The control system 32 is also coupled to a pressure sensor 50 to sense the steam pressure within the HRSG 9. The pressure sensor 50 may be a piezoelectric transducer, or alternatively, the sensor 50 may be a displacement type transducer, or a strain gage transducer, although other alternatives exist. Additionally, the control system 32 may be coupled to a steam flow sensor 110 that senses the rate of flow of steam provided to the turbine 10, and a feed water temperature sensor 120 that senses the temperature of feed water 15 returning to the HRSG 9. Still further, the control system may be coupled to a gas temperature sensor 130 to sense the temperature of the combustion gas flow entering the HRSG 9.

The control system 32 is further coupled to a temperature sensor 52 located at the combustor 3 to sense the combustion temperature within the combustor 3. A pressure sensor 54 is similarly located at the combustor 3 to sense the internal pressure of the combustor 3. A fuel rate actuator 35 is located at the pulverizer and conveyor 21 in order to alter the rate of admission of fuel into the fuel pulverizer and conveyor 21, in response to commands from the control system 32. The control system 32 is therefore capable of receiving inputs from sensors 36 and 50 at the HRSG 9, sensors 110 and 120 located in the steam cycle section 19, and from sensor 130 to provide a control output to the actuator 41 that is coupled to the gas diversion valve 34. The gas diversion valve 34, in turn, returns an indication of the position of valve 34 through the encoder 47. The control system 34 similarly accepts inputs 52 and 54 at the combustor 3 and provides a control output to the fuel rate actuator 35 located at the conveyor 21. Accordingly, the control system 34 has a first closed feedback loop to control the pressure and/or temperature and/or rate of flow of steam delivered to the steam cycle section 19 of the plant 30, and a second closed feedback loop to control the temperature and pressure of combustion gases delivered to the gas turbine section 18 of the plant 30. Typically, the first and second closed feedback loops operate as regulators that maintain predetermined set point values for the operation of the steam cycle section 19 and the gas turbine section 18. The control system 32 is further coupled to an input/output terminal 33 that permits set point values to be input to the control system 32, and various operating parameters of the plant 30 to be monitored. The control system 32 may rely on a proportional, a derivative, or an integral control algorithm, although a proportional-integral-derivative control algorithm is preferred. The input signals received by the control system 32 may be continuous time signals, as received from analog input devices, or the input signals may be discrete time signals, as received from digital input devices. Similarly, the controlled outputs to the fuel rate actuator 35 and the actuator 41 coupled to the gas diversion valve 34 may also be either analog or digital. Finally, the control system 34 may communicate with the encoder 47, the sensors 52 and 54 at the combustor 3, and the sensors 36 and 50 at the HRSG 9, and sensors 110, 120 and 130 by means of electrical or optical conductors, or by wireless means. Similarly, controlled outputs to the actuator 41 and the fuel rate actuator 35 may be by means of electrical or optical conductors, or by wireless means.

Figures 4, 5:
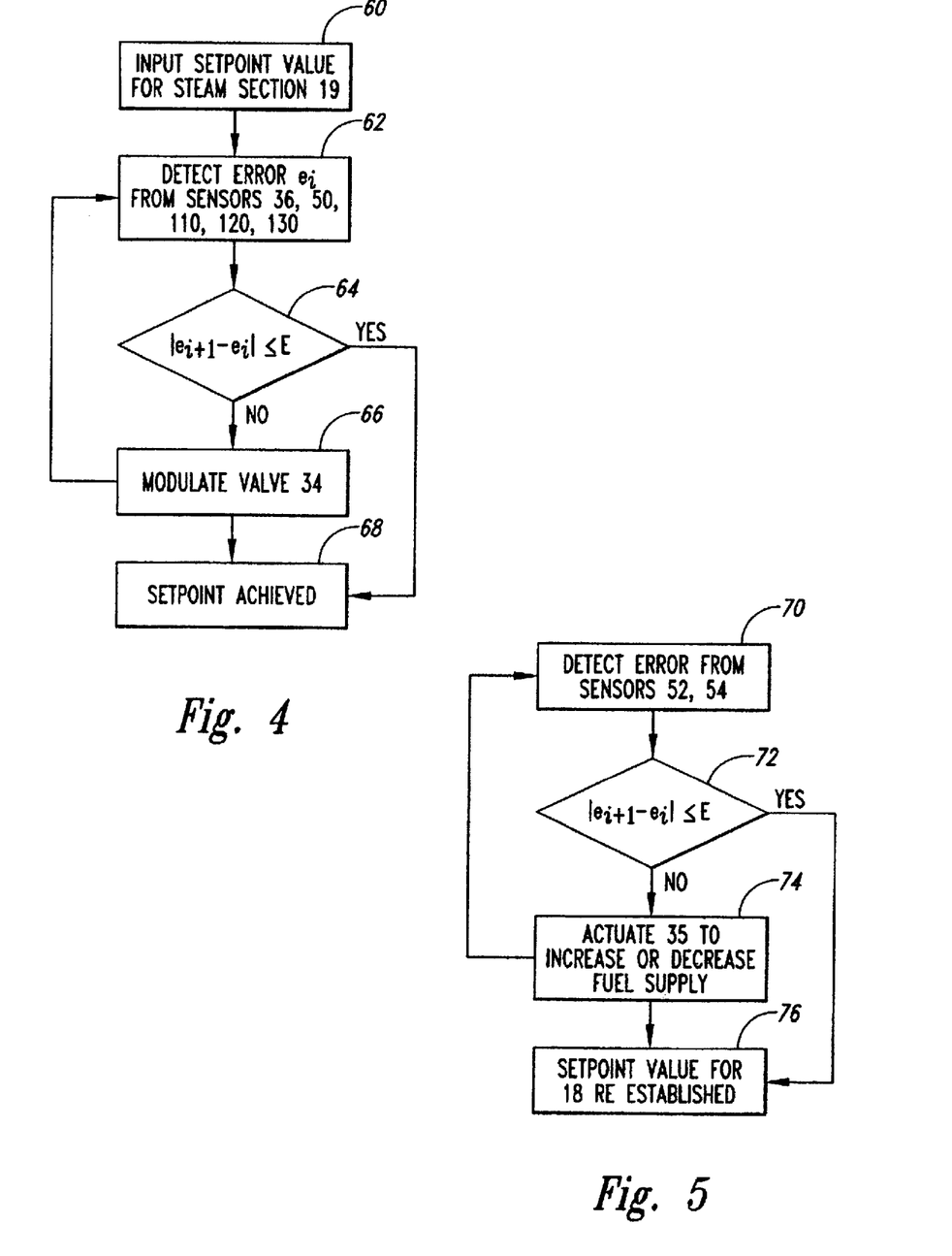
FIG. 4 is a block diagram for set point control of a combined power plant according to an embodiment of the invention.
FIG. 5 is a block diagram for set pint correction of a combined power plant according to an embodiment of the invention.

FIG. 4 is a block diagram for the set point control of the steam cycle section 19 of the combined cycle power plant 30. At step 60, an initial set point value is input to the control system 32 through the input/output terminal 33 (as shown in FIG. 3). The specified set point may be a temperature, or a pressure value to be achieved in the HRSG 9, if the steam to be generated is in the saturated state. Alternatively, if the steam is superheated, the set point value will require that the pressure and temperature of the desired steam state be specified. Further, the set point may also be set by specifying a steam flow rate, as measured by the steam flow sensor 110, and/or a feed water temperature, as measured by feed water temperature sensor 120, and/or by specifying a gas temperature at the inlet of the HRSG 9, as measured by the sensor 130. Moreover, any of the foregoing measured variables may be employed in various sub-combinations in order to provide the desired input signals to the control system 32. At step 62, the error $e_1$ is measured from signals received from the sensors 36, 50, 110, 120, and 130. At step 64, the difference in successive error values is computed, and compared to a predetermined convergence value $\epsilon_1$. On the first pass through step 64, the previous error value may be set to zero, so that the measured error is compared directly to $\epsilon_1$. On each successive pass, the difference between the measured error and the measured error from the previous pass is computed, and compared to $\epsilon_1$. At step 66, the position of valve 34 is modulated by the actuator 41 in response to a control signal received by the actuator 41 from the control system 32. When the difference in successive error values is less than, or equal to, the converge value, the set point has been attained, as shown at step 68.

A change in the set point value for the steam cycle section 19 will generally cause the gas turbine section 18 to deviate from its set point due to the diversion of combustion gas through the gas diversion valve 34. Referring now to FIG. 5, a block diagram to compensatingly correct the set point of the gas turbine cycle section 19 of the combined cycle power plant 30 is shown. At step 70, an error $e_i$ is detected from the temperature sensor 52 and the pressure sensor 54 located at the combustor 3 (see FIG. 3). At step 72, the difference in successive error is computed and compared to a convergence value $\epsilon_2$. On the first pass through step 72, the previous error value may be set to zero, so that the measured error is compared directly to $\epsilon_2$. Each successive pass will then compute the difference between the measured error and the measured error from the previous pass. At step 74, the actuator 35 is controlled to increase or decrease the rate of fuel admitted to the fuel pulverizer and conveyor 21. When the error difference at step 72 becomes less than, or equal to the predetermined value $\epsilon_2$, the set point value for the gas turbine section 18 is reestablished, as indicated at step 76.

Figure 6:
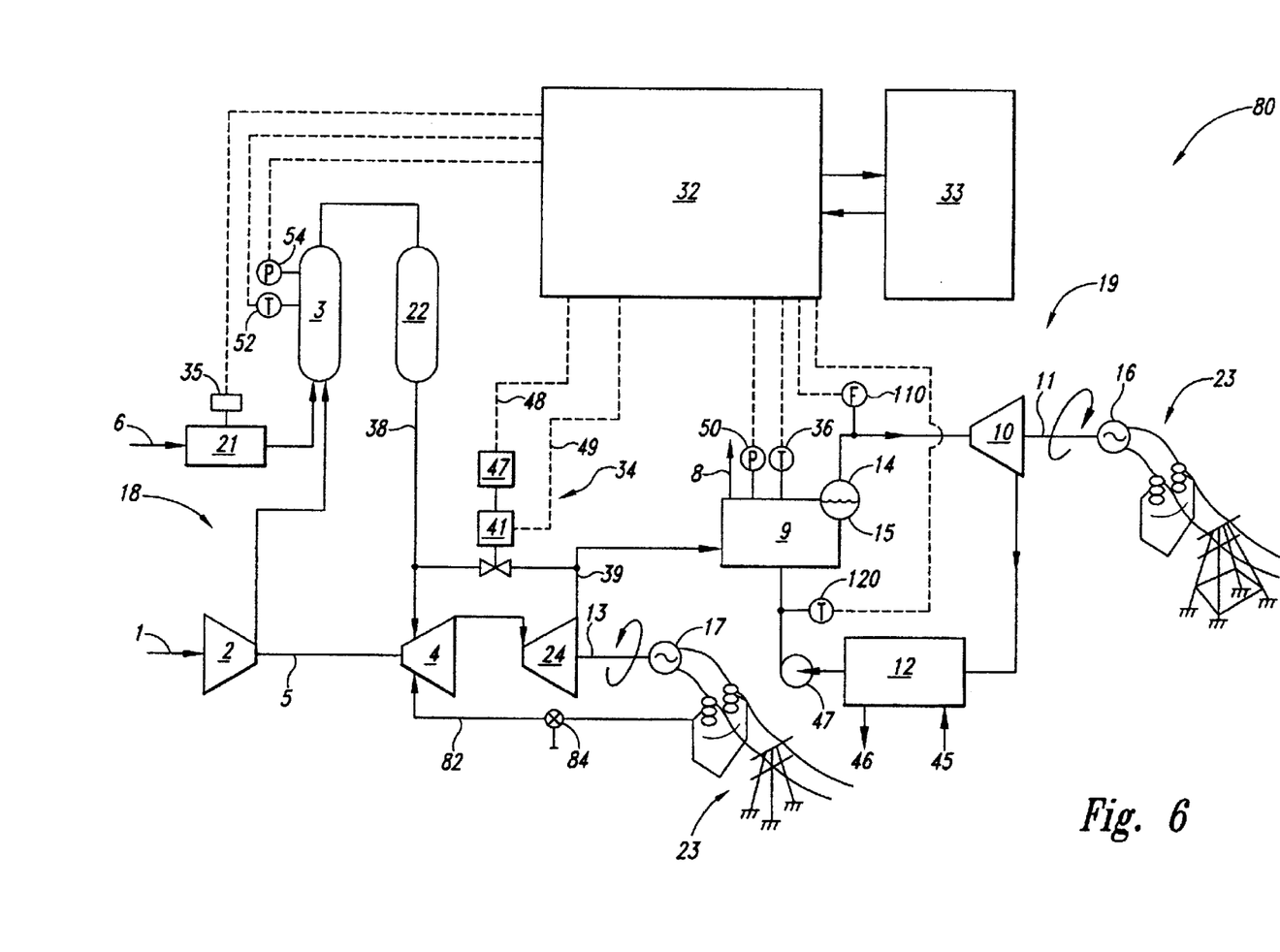
FIG. 6 is a schematic view of a combined cycle power plant according to another embodiment of the invention.

FIG. 6 is a schematic view of a combined cycle power plant 80 in accordance with an embodiment of the invention. The combined cycle power plant 80 is substantially similar to the combined cycle power plant described in connection with FIG. 2, with the addition of a steam supply line 82 that is fluidly coupled to the HRSG 9 and to the turbine 4 to communicate a portion of the steam 14 produced in the HRSG 9 to an inlet portion of the turbine 4. The mass flow of steam communicated from the HRSG 9 to the turbine 4 may be controlled by a valve 84 that is positioned in the line 82. The valve 84 may be either manually controlled, or alternatively, the valve may be controlled by the control system 32. The introduction of steam into the turbine 4 advantageously permits a mixture of combustion gases and steam to be expanded in the turbine 4, thus increasing the power output of the turbine 4.

Combined cycle power plants fueled by biomass sources find particular utility in the sugar cane processing industry. However, prior art plants are typically sufficient only to satisfy the mechanical and electrical requirements of the plant, so that no excess electrical energy is generally available to electrify surrounding dwellings, or alternatively, to be transferred to a utility grid. Moreover, due to various limitations, power plants that provide electrical power and steam to sugar cane processing plants typically operate on a seasonal basis only, despite the fact that sufficient amounts of biomass fuel material, in the form of sugar cane bagasse, is generally available to sustain operation of the power plant on an annual basis.

Figure 7:
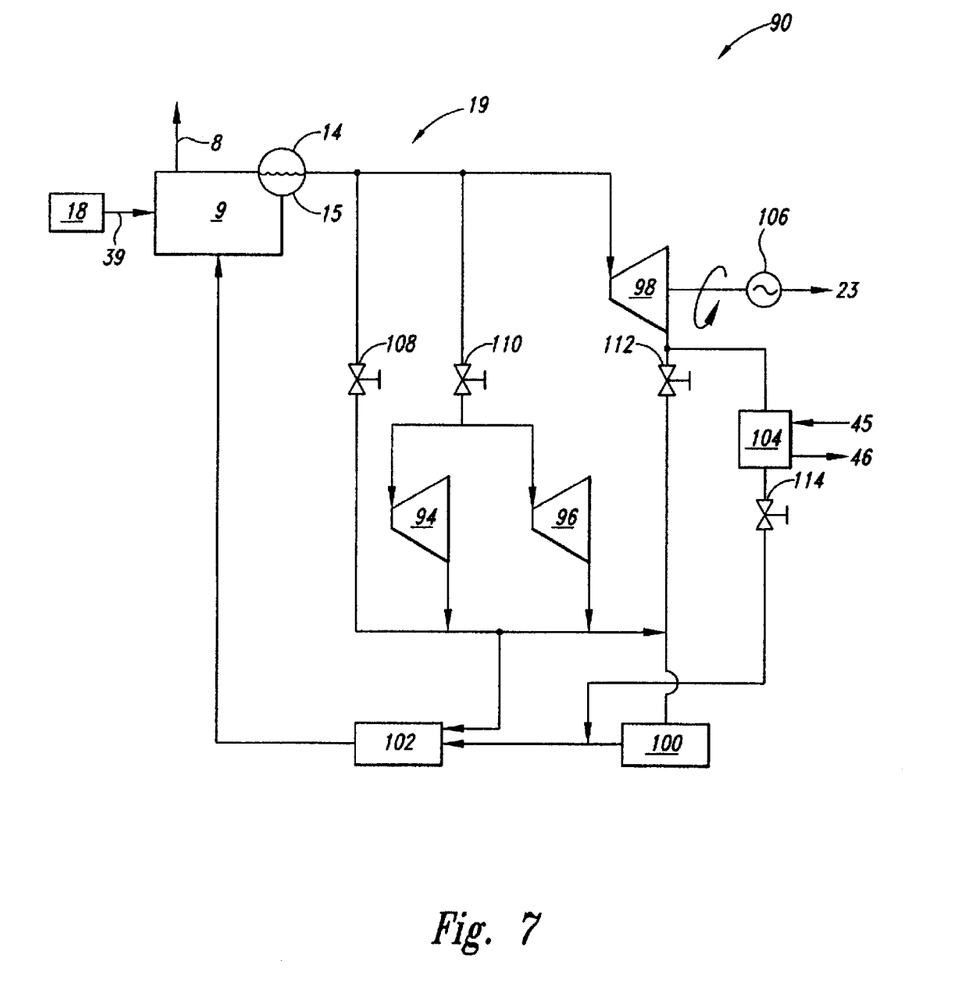
FIG. 7 is a schematic view of a combined cycle power plant according to still another embodiment of the invention.

FIG. 7 is a schematic view of a combined cycle power plant 90 in accordance with still another embodiment of the invention. The gas turbine section 18 of the combined cycle plant 90 is substantially the same gas turbine section 18 that is disclosed in connection with FIGS. 2 and 6. The steam cycle section 19 is comprised of an HRSG 9 that receives gases that may be augmented by diverting at least a portion of the hot combustion gases through the flow diversion valve 34 (as shown in FIGS. 2 and 6) as described in the foregoing embodiments. In addition, the HRSG 9 may supply steam to at least one of the turbines in the gas turbine section 18 through a steam delivery line (as shown in FIG. 6). Additionally, various machinery and implements used by the sugar cane processing industry also comprise the steam cycle section 19 of the plant 90, including cane crushers and knives 94 to cut and crush the sugar cane, an other auxiliary machinery 96. Steam may also be directed to a mill 100 for process purposes, such as space heating or drying. Steam may also be directed to a steam turbine 98, which may supply electrical energy for mill operation and to an external grid 23 through a generator 106. A condenser 104 is provided to condense steam discharged by the turbine 98. The condenser 104 receives cooling water from a cooling water source 45 and releases the cooling water to a thermal dump 46. A deaerator 102 collects feed water from the steam cycle section 19 to remove air from the feed water.

Still referring to FIG. 7, during periods of the season when the mill 100 is in operation, a valve 110 is moved to the open position to allow steam generated within the HRSG 9 to be communicated to the cane crushers and knives 94, and the auxiliary machinery 96. Similarly, a valve 108 is opened in order to communicate steam from the HRSG 9 to the plant 100 for process heat requirements. A valve 112 is also opened to allow steam to be communicated to the turbine 98. Since the condenser 104 may not be required during plant operation, a valve 114 remains generally closed during periods when the plant 100 is in operation.

During periods when the plant 100 is not operating, which may be a substantial portion of a given year, the valves 108, 110 and 112 may be closed to interrupt the flow of steam produced by the HRSG 9 to the cane crushers and knives 94, the other auxiliary machinery 96, and the plant 100, since the plant 100 is not operative. Correspondingly, the valve 114 is moved to the open position in order to allow steam to be communicated from the HRSG 9 and through the turbine 98. The mechanical energy produced by the turbine 98 permits the generation of electrical energy at the generator 106, which may be supplied to a local utility grid 23. Steam exhausted from the turbine 98 is subsequently condensed in the condenser 104, and returned to the HRSG 9 through a deaerator 102.

The foregoing embodiment thus advantageously permits the combined cycle plant 90 to be efficiently operated throughout the entire year by allowing the steam cycle section 19 to be rapidly configured to perform tasks associated with sugar cane processing, and to provide electrical power to a utility grid during periods of processing plant inactivity.

The above description of illustrated embodiments of the invention is not intended to be exhaustive or to limit the invention to the precise form disclosed. While specific embodiments of, and examples of, the invention are described in the foregoing for illustrative purposes, various equivalent modifications are possible within the scope of the invention, as those skilled in the relevant art will recognize. Moreover, the various embodiments described above can be combined to provide further embodiments. For example, the combined cycle power plant as disclosed may be designed in modular form to allow the plant to be conveniently relocated to various sites to take advantage of variances in fuel supply. Further, modifications to the fuel handling and ash handling systems are within the scope of the invention to allow a variety of agricultural wastes to be used, such as sawdust, rice hulls, cocoanut husks, bagasse and the like. Accordingly, the invention is not limited by the disclosure, but instead the scope of the invention is to be determined entirely by the following claims.

What is claimed is:

1. A combined cycle plant, comprising:
    a gas turbine section including one or more turbine stages for expanding a combustion gas, the one or more stages having an inlet that receives the combustion gas and an outlet that exhausts the combustion gas when fully expanded by the one or more turbine stages;
    a gas diversion system fluidly coupled to the inlet and the outlet of the one or more turbine stages, the gas diversion system including a unitary flow regulation device to selectively divert a portion of the combustion gas from the inlet to the outlet;
    a control system adapted to receive input signals from selected sensors positioned in the plant and capable of exchanging signals with the gas diversion system to controllably divert the combustion gas from the inlet to the outlet; and
    a steam cycle section fluidly coupled to the outlet of the one or more turbine stages, wherein the steam cycle section further includes a heat recovery steam generator fluidly coupled to the outlet of the gas turbine section, and the selected sensors include at least one temperature sensor coupled to the steam generator capable of communicating a signal corresponding to a steam temperature within the generator to the control system, and at least one pressure sensor coupled to the steam generator capable of communicating a signal corresponding to a steam pressure within the generator to the control system.

2. The combined cycle plant of claim 1, wherein the unitary flow regulation device includes a valve capable of continuously controlling the diverted gas over a selected range of mass flow values.

3. The combined cycle plant of claim 2, wherein the valve is coupled to an actuator capable of receiving a positional signal from the control system and correspondingly positioning the valve, and an encoder capable of detecting a valve position and providing a valve position signal to the control system.

4. The combined cycle plant of claim 1, wherein the heat recovery steam generator further includes a feedwater inlet to receiving a feedwater flow in the steam cycle section and a steam outlet to deliver a steam flow in the team cycle section, and the selected sensors further include at least one temperature sensor coupled to the feedwater inlet capable of communicating a signal corresponding to a feedwater flow temperature to the control system, and a flow sensing device coupled to the steam outlet and capable of communicating a signal corresponding to a steam flow rate to the control system.

5. A combined cycle plant, comprising:
    a gas turbine section including one or more turbine stages for expanding a combustion gas, the one or more stages having an inlet that receives the combustion gas and an outlet that exhausts the combustion gas when fully expanded by the one or more turbine stages;
    a gas diversion system fluidly coupled to the inlet and the outlet of the one or more turbine stages, the gas diversion system including a unitary flow regulation device to selectively divert a portion of the combustion gas from the inlet to the outlet;
    a control system adapted to receive input signals from selected sensors positioned in the plant and capable of exchanging signals with the gas diversion system to controllably divert the combustion gas from the inlet to the outlet; and
    a steam cycle section fluidly coupled to the outlet of the one or more turbine stages, wherein the steam cycle section further includes a heat recovery steam generator fluidly coupled to the outlet of the gas turbine section, and the selected sensors include at least one temperature sensor coupled to the steam generator capable of communicating a signal corresponding to a steam temperature within the generator to the control system, and at least one pressure sensor coupled to the steam generator capable of communicating a signal corresponding to a steam pressure within the generator to the control system, and further wherein the heat recovery steam generator further includes a feedwater inlet to receive a feedwater flow in the steam cycle section and a steam outlet to deliver a steam flow in the steam cycle section, and the selected sensors further include at least one temperature sensor coupled to the feedwater inlet capable of communicating a signal corresponding to a feedwater flow temperature to the control system, and a flow sensing device coupled to the steam outlet and capable of communicating a signal corresponding to a steam flow rate to the control system.

6. The combined cycle plant of claim 5, wherein the unitary flow regulation device includes a valve capable of continuously controlling the diverted gas over a selected range of mass flow values.

7. The combined cycle plant of claim 6, wherein the valve is coupled to an actuator capable of receiving a positional signal from the control system and correspondingly positioning the valve, and an encoder capable of detecting a valve position and providing a valve position signal to the control system.

* * * * *